INVENTORS
Douglas Dewar
Frank Radcliffe Mortimer
Glyn Phillip Reginald Farr
by Benj. T. Rauber
attorney 3,129,903
AIRCRAFT BRAKING SYSTEM
Douglas Dewar, Wolston, near Coventry, Frank Radcliffe Mortimer, Styvechale, Coventry, and Glyn Phillip Reginald Farr, Earlsdon, Coventry, England, assignors to Dunlop Rubber Company Limited, London, England, a British company
Filed Jan. 3, 1962, Ser. No. 164,090
Claims priority, application Great Britain Jan. 12, 1961
6 Claims. (Cl. 244—111)

The present invention relates to an aircraft braking system and to a safety switch system therefor.

When a modern aircraft lands on a runway it may be in such an attitude that while the main wheels of a tricycle undercarriage are firmly on the ground the nose wheel may not be and a premature application of the brakes by the pilot may bring the nose-wheel down on to the runway with damaging force. A second potentially damaging condition may occur when the aircraft has touched down, the pilot has applied his brakes and aerodynamic forces or runway irregularities lift the aircraft clear of the runway again. In such a condition the wheels, being still under braking pressure, may lock and may impact the runway in that condition when the aircraft once more returns to earth. Damage to tyres, brakes, undercarriage or even to the whole aircraft might occur if such an event happened.

The object of the present invention is to provide an improved braking system in which such potentially dangerous conditions cannot occur.

According to the present invention an electrically controlled braking system for an aircraft provided with a nose wheel comprises a switch responsive to the load carried by said wheel to permit actuation of the brakes associated with the main landing wheels only when said load exceeds a preedtermined value.

Preferably the nose wheel is provided with a weight sensitive switch which is connected both to a resistor and a dividing arm of a control potentiometer and is adapted to energise the resistor when the nose wheel is not firmly in contact with the ground and to energise the potentiometer when it is.

Both said resistor and dividing arm of the potentiometer are adapted to be connected through the weight switch to a brake control solenoid the strength of the current in which largely governs the brake pressure applied to the hydraulic brakes.

The datum wheel weight switch is connected between the brake control solenoid and one terminal of the electric circuit and prevents the application of hydraulic pressure to the brakes when the datum wheel is off the ground. The datum wheel is arranged to touch the ground before the main support wheels of the aircraft.

One embodiment of the invention will now be described with reference to the accompanying drawings of which:

Figure 1:
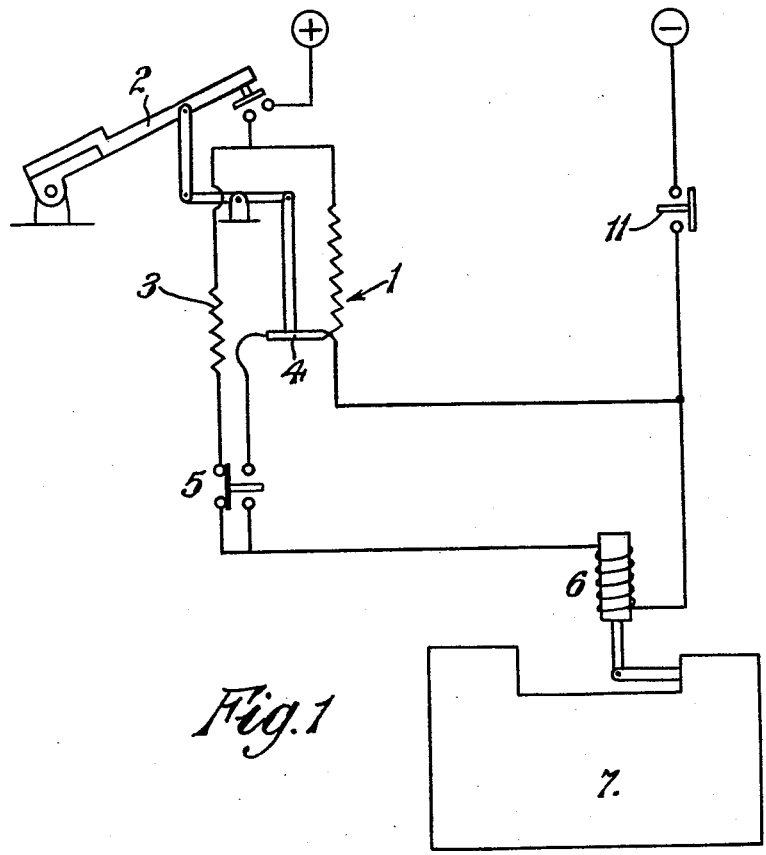
FIGURE 1 shows a diagrammatic form of an electrical circuit which includes the safety switches.

The aircraft safety switching system of our invention comprises a potentiometer 1, actuable through a pedal 2 by the pilot of the aircraft, a resistor 3 connected in parallel with the potentiometer 1. The resistor 3 and dividing arm 4 of the potentiometer are in series with a nose wheel switch 5 and a brake control solenoid 6. The brake control solenoid 6 forms part of a brake control 7, the operation of which is fully described in our co-pending application Ser. No. 164,683, filed January 8, 1962, now abandoned. While the nose wheel is in the air the resistor 3 is connected in series with the brake control solenoid 6. Under these conditions the nose wheel switch 5 passes only a small current, governed by the resistor 3, to the brake control solenoid 6. The braking force of the aircraft is arranged to be proportional to and controlled by the strength of the current through the brake control solenoid. Consequently the small current in the solenoid will be sufficient to cause a small braking force to be applied to the main wheels sufficient to bring the nose wheel down on to the runway with a minimum of shock.

When the nose wheel begins to carry a part of the load of the aircraft its support gear deflects under the load. This deflection is used to actuate the switch 5. The switch can be suitably positioned so that it is actuated when a predetermined proportion of the aircraft weight is carried by the nose wheel.

Actuation of the switch 5 disconnects the resistor 3 from the solenoid 6 and connects the dividing arm 4 of the potentiometer 1 to the solenoid 6. Thereupon full braking pressure may be applied to the brakes provided the main wheels are on the ground.

Figures 2, 3:
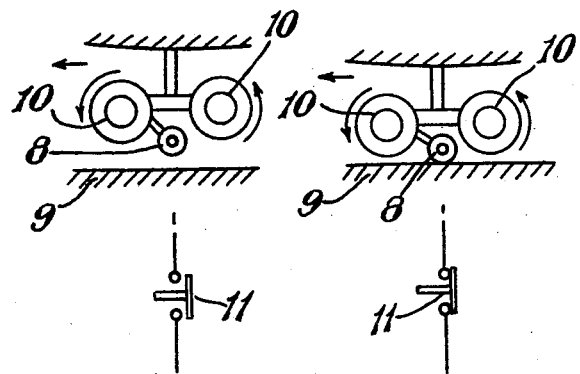
FIGURE 2 shows the arrangement of the datum wheel in relation to the main aircraft wheels before touching the ground and also the open condition of the datum wheel switch.
FIGURE 3 shows the arrangement of FIGURE 2 when the datum wheel is in contact with the ground and the main wheels are about to alight, and the closed condition of the datum wheel switch with the wheels in this position.

An unbraked datum wheel 8 is arranged to contact the runway 9 before the main wheels 10 on landing, as shown in FIGURE 3. When the datum wheel 8 and main wheels 10 first contact the runway 9 a datum wheel load sensitive switch 11 is closed thus completing the circuit and allowing braking to take place.

Should the aircraft now lift completely off the runway 9 as illustrated by FIGURE 2 the circuit will be broken by virtue of the opening of the datum wheel switch 11. All current to the control solenoid 6 then ceases, completely cutting off all braking pressure. The main wheels 10 are then free to rotate when they reach the runway 9 again and no damage will occur.

If the aircraft is lifted off the runway 9 to such an extent that the datum wheel 8 only remains in contact with the ground then the circuit will not be broken as the datum wheel switch 11 will remain closed. Under conditions such as these reliance is placed on a skid control integral with the present system and the function of which is to detect and correct wheel locking. If the main wheels 10 are lifted into the air with the brakes on they immediately begin to decelerate and the speed differential between the main wheels and the unbraked datum wheel is detected by the skid control which operates to release the brakes to allow the wheels to rotate when they again contact the runway.

A datum wheel 8 is preferably fitted to each of the two main wheel bogeys and the load sensitive switches associated therewith are fitted in series so that both datum wheels have to be on the ground for braking to take place.

The skid control device is fully described in our co-pending application Ser. No. 164,919, filed January 8, 1962.

Thus the braking problems presented by the fact that any or all the wheels are off the ground are overcome.

The electrical system may use alternating or direct current.

Having now described our invention, what we claim is:

1. An electrically controlled braking system for an aircraft provided with a nose wheel which comprises a brake control unit, an electric circuit connected to said control unit and having two branches in parallel, a resistor in the first of said branches to permit a low power supply to said control unit, a power control means in the second of said branches to permit a controlled supply of power to said control unit, and a switch normally closing said first branch and controlled by the deflection of the nose wheel gear under load to open said first branch and close said second branch.

2. A braking system according to claim 1 wherein said resistor is such as to restrict the braking force applied to the aircraft to an amount sufficient to bring the nose wheel on to the ground without damage to the aircraft.

3. The braking system of claim 1 having a manually controlled means for controlling said power control means.

4. The braking system of claim 3 in which said power control means is a potentiometer.

5. The braking system of claim 1 comprising a datum wheel positioned to be displaced under load when said main wheels of the aircraft contact a runway and a second, normally closed switch in said circuit in series with said branch circuits and actuated by said datum wheel when displaced under load.

6. A braking system according to claim 5 wherein said datum wheel is resiliently supported adjacent a main wheel of the aircraft and on normal landing of the aircraft touches the ground before the main wheel so that a predetermined vertical movement of the datum wheel closes the second switch before the main wheels are in contact with the ground.

References Cited in the file of this patent
UNITED STATES PATENTS 2,077,178    Mirel  ----------------- Apr. 13, 1937

FOREIGN PATENTS 539,020    Canada  ---------------- Apr. 2, 1957